No. 841,486. PATENTED JAN. 15, 1907.
C. W. DAKE.
ELASTIC FLUID TURBINE.
APPLICATION FILED NOV. 29, 1905.
6 SHEETS—SHEET 3.
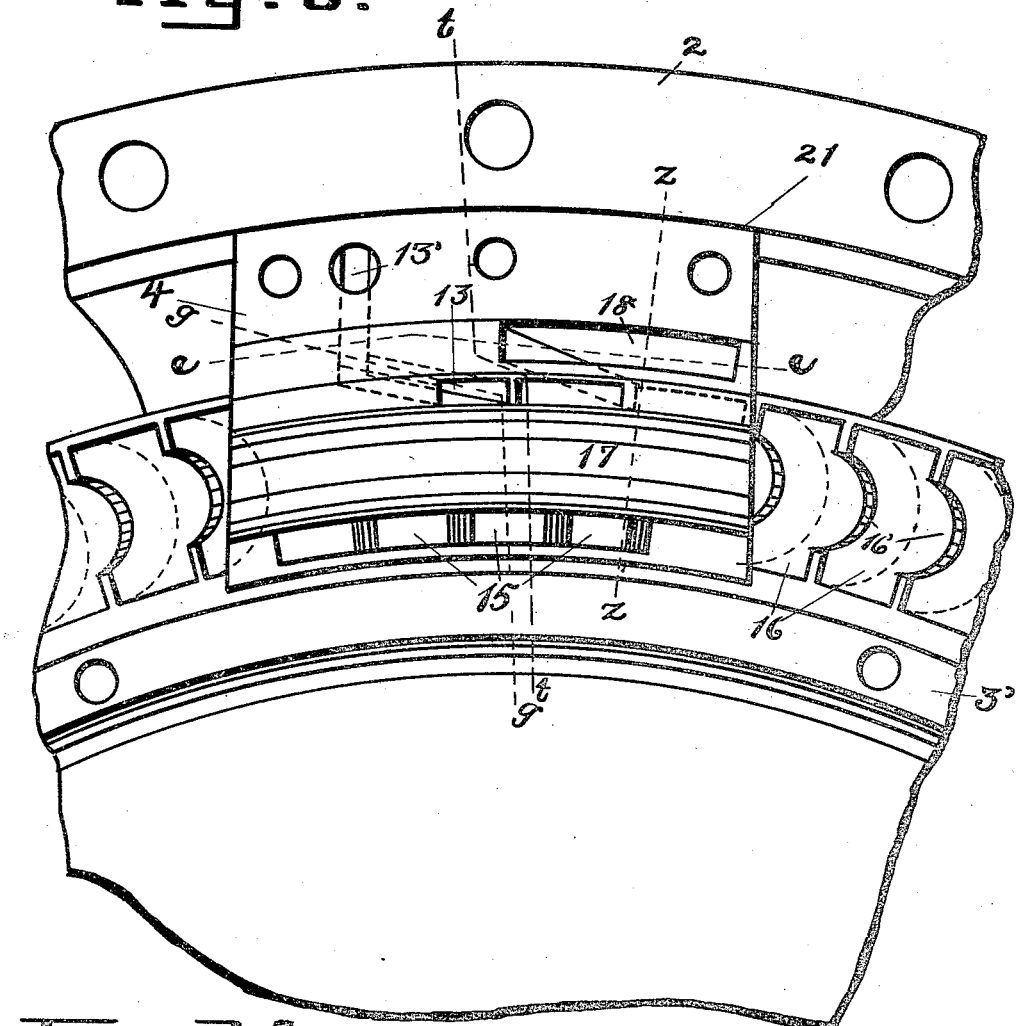
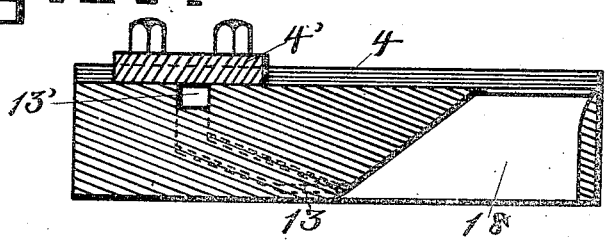
WITNESSES:
INVENTOR
Charles W. Dake
BY
Chappell & Earl
ATTORNEYS

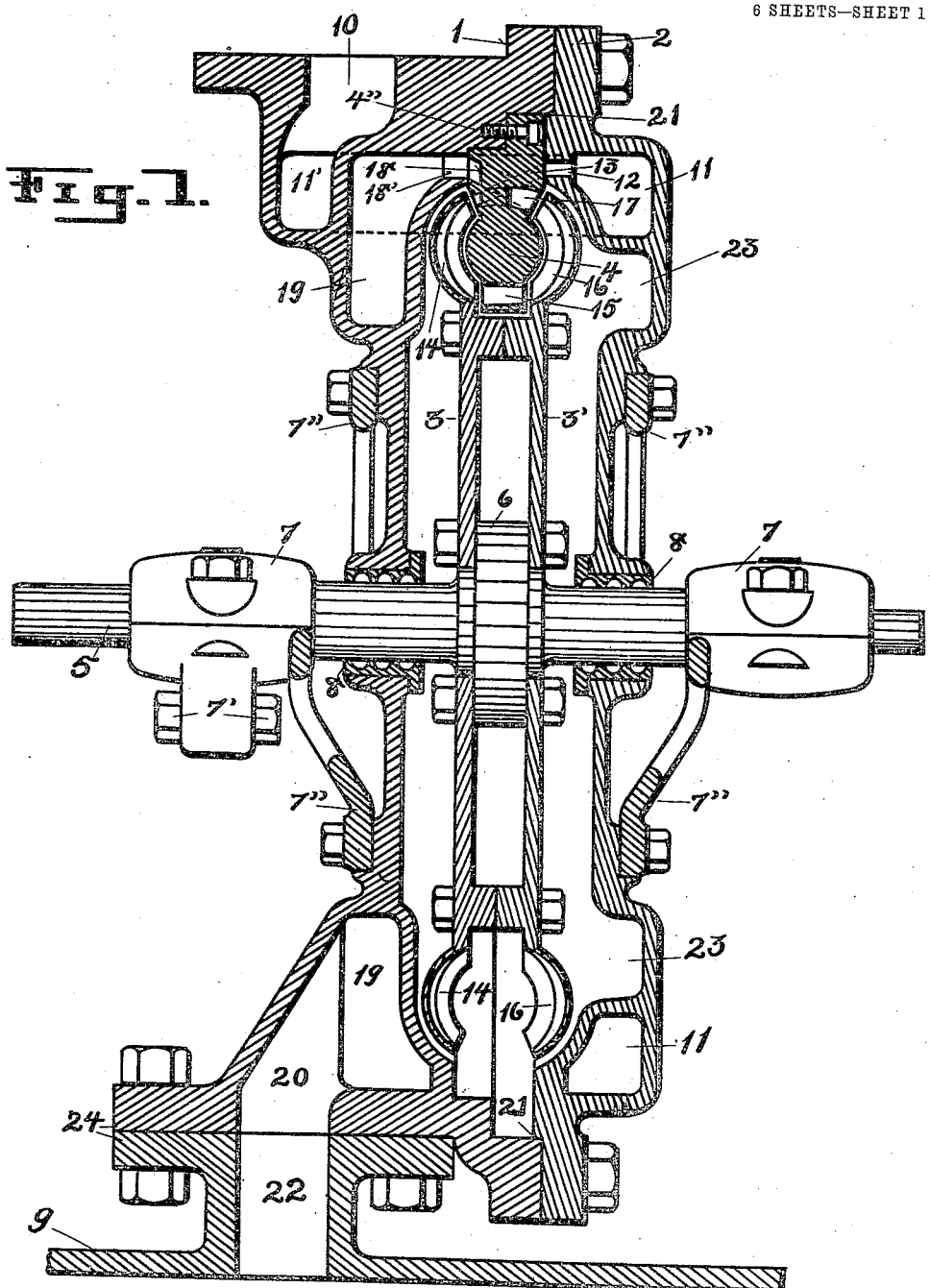

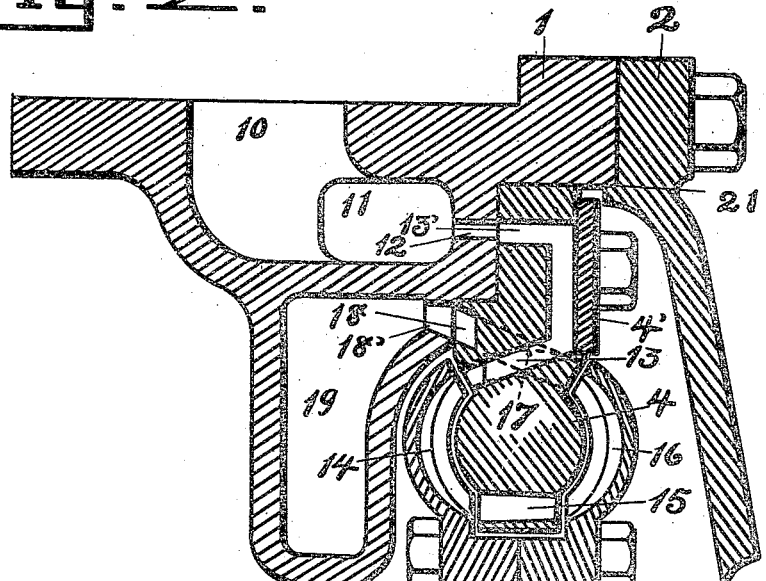
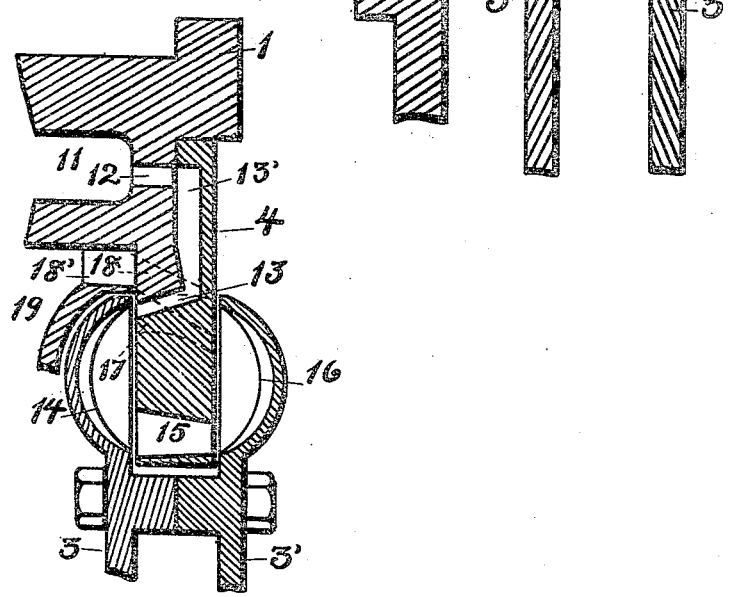

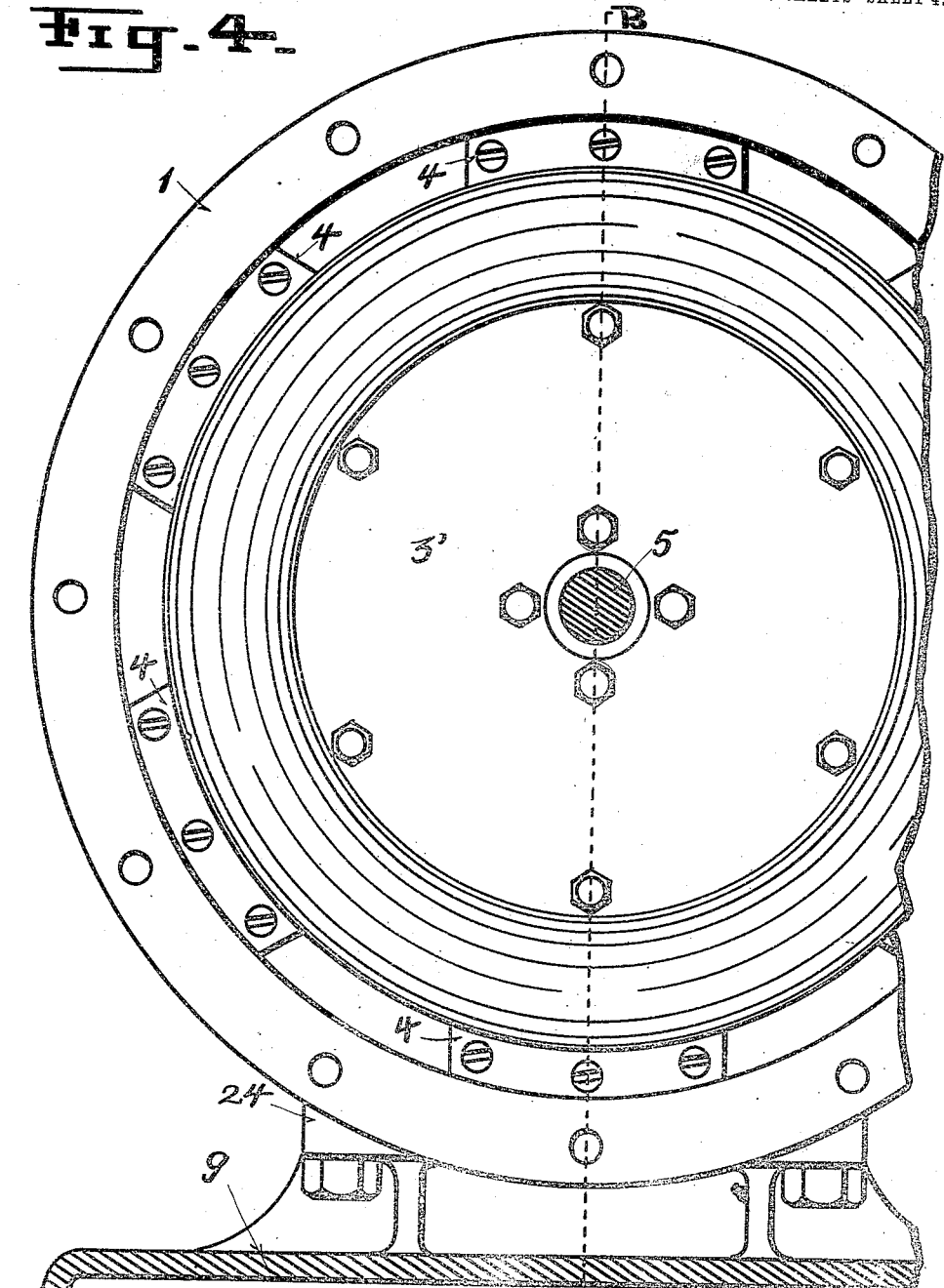

No. 841,486. PATENTED JAN. 15, 1907.
C. W. DAKE.
ELASTIC FLUID TURBINE.
APPLICATION FILED NOV. 29, 1905.
6 SHEETS—SHEET 5.
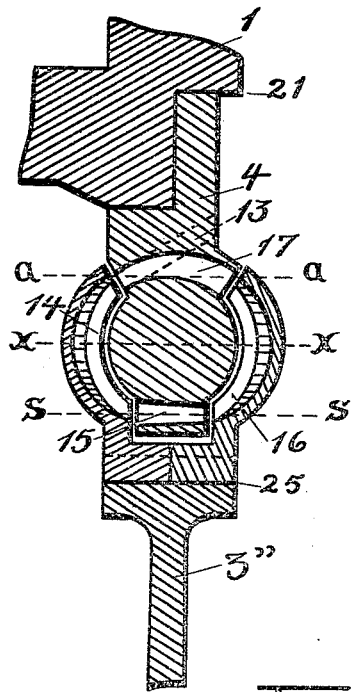
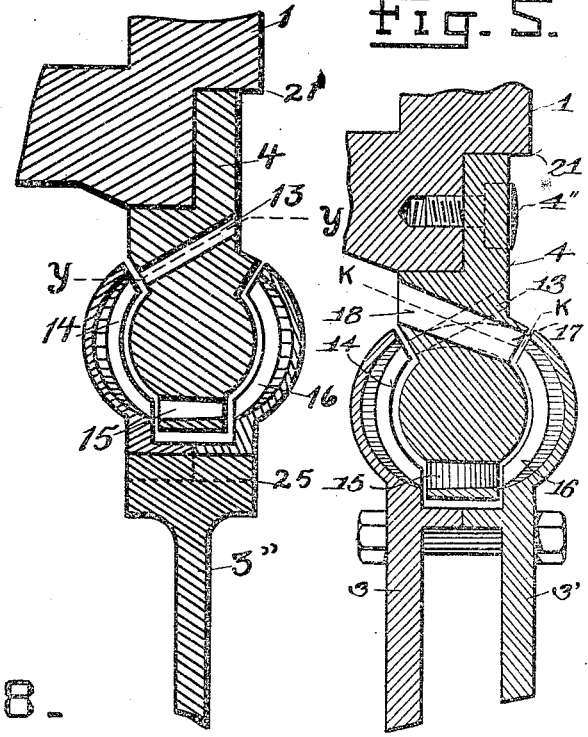
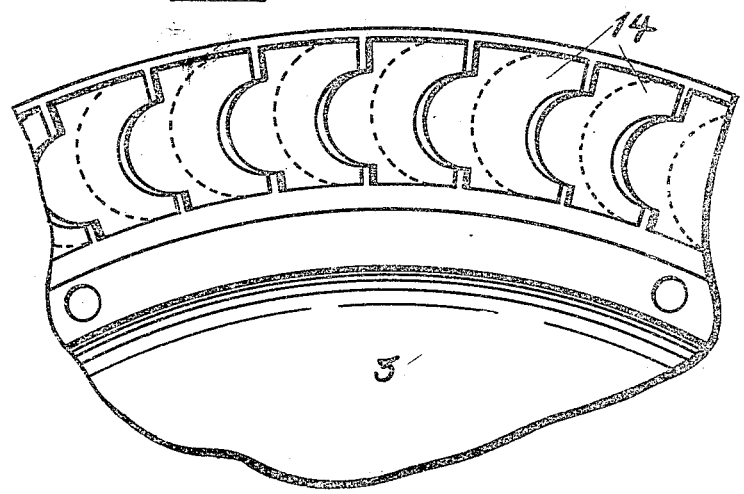
WITNESSES:
INVENTOR
ATTORNEYS No. 841,486. PATENTED JAN. 15, 1907.
C. W. DAKE.
ELASTIC FLUID TURBINE.
APPLICATION FILED NOV. 29, 1905.
6 SHEETS—SHEET 6.
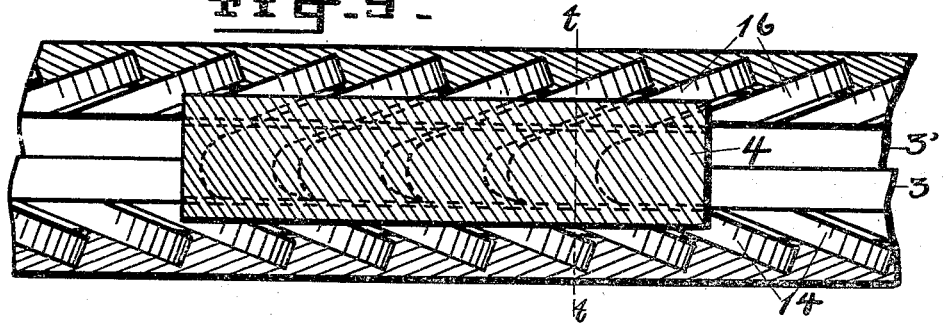
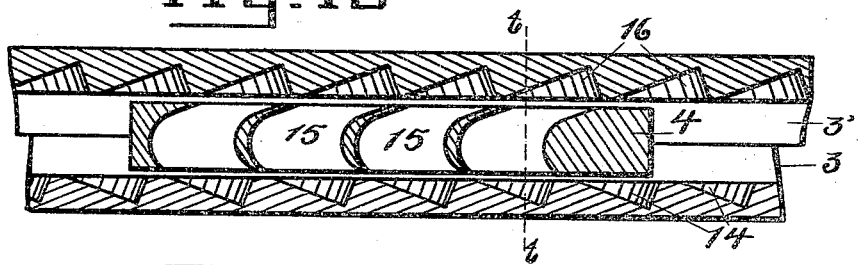
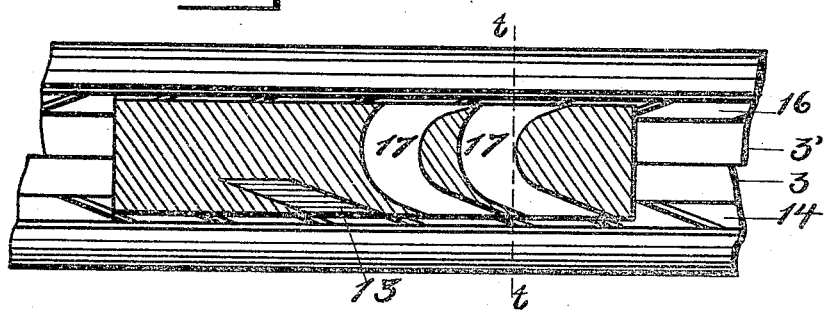
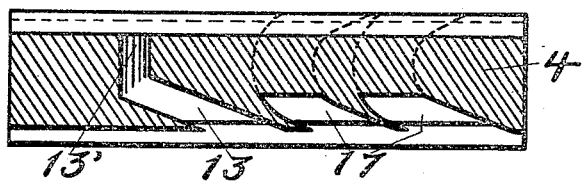
WITNESSES:
Ethel A. Bradford
Lulu G. Greenfield
INVENTOR
Charles W. Dake
BY
Chappell Earl
ATTORNEYS

UNITED STATES PATENT OFFICE.

CHARLES W. DAKE, OF GRAND RAPIDS, MICHIGAN.

ELASTIC-FLUID TURBINE.

No. 841,486.　　　　Specification of Letters Patent.　　Patented Jan. 15, 1907.

Application filed November 29, 1905. Serial No. 289,658.

*To all whom it may concern:*

Be it known that I, CHARLES W. DAKE, a citizen of the United States, residing at the city of Grand Rapids, county of Kent, State of Michigan, have invented certain new and useful Improvements in Elastic-Fluid Turbines, of which the following is a specification.

This invention relates to improvements in elastic-fluid turbines.

The objects of this invention are, first, to simplify the construction of such turbines generally; second, to provide an improved construction of turbine-wheel; third, to provide an improved construction of buckets in a turbine-wheel; fourth, to provide improved nozzles and delivery-passages in an elastic-fluid turbine; fifth, to provide an improved arrangement in combination of delivery-passages and buckets for an elastic-fluid-turbine wheel; and, sixth, to provide an improved arrangement of the passages, nozzles, and exhaust-chambers in an elastic-fluid turbine.

Further objects and objects relating to the details of construction will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1 is a vertical sectional elevation view taken on a line corresponding to line B B of Fig. 4, showing the invention as adapted to smaller sizes of turbine-engines. Fig. 2 is an enlarged detail sectional view taken on a line corresponding to line B B of Fig. 4, showing the case, cover, wheel, buckets, nozzles, and guide-passage blocks in position, the same being slightly modified, in that the channel 4 for distributing the fluid to the several nozzles is in the casing 1 in place of in the casing-cover 2. Fig. 3 is an enlarged detail view of one of the nozzle and guide passage blocks 4 shown in Fig. 2, the view being taken from the casing side and showing the relation of this block to the turbine wheel, buckets, and cover, portions of which parts are illustrated. Fig. 4 is a detail side elevation view of the casing with the turbine-wheel and nozzle and guide passage blocks in position. Fig. 5 is an enlarged detail sectional view of a slight modification of the nozzle and guide passage block as arranged between the oppositely-facing U-shaped buckets, the nozzle being indicated by dotted lines, the section being transverse to the rows of buckets and showing the first row of buckets, the first guide-passage, the second row of buckets, the second guide-passage, in dotted lines, and exit-passages, the figure being taken on line z z of Fig. 3. Fig. 6 is an enlarged cross-sectional view of the nozzle and guide passage block in place, as in Fig. 5, showing the nozzle in dotted lines, the buckets, the first guide-passage, and second guide-passage, the same being taken on line t t of Figs. 3, 9, 10, and 11. Fig. 7 is an enlarged detail cross-sectional view of one of the nozzle and guide passage blocks, showing the admission-nozzle, the first row of U-shaped buckets, the first guide-passage, and the second row of U-shaped buckets, taken on the irregular line g g of Fig. 3. Fig. 8 is a detail view of a section of the wheel, showing a portion of one line of the oppositely-facing buckets, the same being an interior view of a portion of one-half of the wheel looking in the direction of the axis of the wheel and into the buckets. Fig. 9 is an enlarged sectional view of one of the nozzle and guide passage blocks, taken on line x x of Fig. 6, showing details of the nozzle and guide passage blocks and the U-shaped buckets at each side of said nozzle and guide passage block. Fig. 10 is an enlarged sectional view of the said nozzle and guide passage block, taken on line s s of Fig. 6, showing how such nozzles register with the U-shaped buckets at each side. Fig. 11 is an enlarged detail sectional view of the nozzle and guide passage block and wheel, taken on a line corresponding to line a a of Fig. 6, showing the second or return guide-passages and mouth of the admission-nozzle, the wheel appearing in full lines. Fig. 12 is an enlarged detail sectional view of the nozzle and guide passage block, taken on irregular line y y of Fig. 8, showing the admission-nozzle and portions of the guide-passages, the dotted lines showing the direction thereof. Fig. 13 is an enlarged detail transverse sectional view of a modification of the guide-passage block 4, in which the annular part which enters the depressions in the buckets is omitted, and the faces of the opposed buckets are made flat and parallel, the fluid-passage also being simplified; and Fig. 14 is an enlarged detail sectional view of the nozzle and guide passage block 4, taken on irregular line k'k of Fig. 5, the admission-nozzle and the exit-passage 18 being indicated by dotted lines, also showing a small block 4' and the nozzle-passage 13'.

In the drawings similar numerals of reference refer to similar parts throughout the several views.

Referring to the numbered parts of the drawings, the turbine-casing 1 is provided with a suitable cover 2, which is supported on a suitable base by flange 24. Within the cover 2 is a chamber 23, which serves to embrace the buckets and the moving parts and to insulate them from the exterior by a chamber of live steam.

3 3' are the two halves of the turbine-wheel, the same being of disk-like formation, which are secured to the shaft 5 by being bolted or clamped to a flange 6 thereon. This shaft is supported in suitable bearings 7 7, carried by brackets 7" 7", secured to the casing 1 and casing-cover 2, respectively. One of these bearings is made adjustable longitudinally by screws 7' for the purpose of adjusting the position of the turbine-wheel in its relation to the nozzle and guide passages.

At the periphery of the turbine-wheel oppositely-facing semicircular rows of buckets 14 and 16 are arranged on opposite halves thereof. The nozzle and guide passage blocks 4 are arranged at intervals between these oppositely-facing rows of buckets, their position and relation around the circle of the wheel being clearly indicated in Fig. 4 and their general cross-sectional arrangement definitely appearing in the preferred construction in Figs. 1, 2, 5, 6, and 7, and in a modified form in Fig. 13. Sectional views longitudinal of the blocks and series of buckets appear in Figs. 9, 10, 11, and 12, and an enlarged detail of the block appears in Fig. 3, from which many of the sectional views are obtained. There are six of these blocks in my preferred construction. They are retained in the casing 1 by means of screws 4".

Fluid-passages 10 are in the casing 1 in the preferred construction and connect to the passages 11', which passages 11' connect to the elastic-fluid chamber or passage 11. This passage 11 leads to the several nozzles corresponding to the six different nozzle-blocks arranged within the casing, the passage 11 being preferably in the casing-cover 2.

A passage 12 leads from the chamber 11 to each admission-nozzle 13 in the respective blocks 4. The first row of buckets 14, as before remarked, are U-shaped and are cut at an angle by a suitable rotary cutter or milling-tool to receive the annular discharge from the nozzles. The guide-passage 15 clearly appears in Figs. 1 and 10 and is indicated by dotted lines in Fig. 9, through the block to conduct the fluid from the first row of buckets 14 to the second row of buckets 16 on the opposite side of the wheel, this passage 15 being curved to substantially reverse the direction or flow of the elastic fluid so that it will strike at the proper angle into the inner sides of the buckets 16 and pass toward the periphery of the wheel for driving the wheel on that side. Guide-passages 17 are through the upper part of the block 4 for passing the fluid from the buckets 16 back to the tops of the buckets 14, where it is delivered just in advance of the admission-nozzle 13, and from thence the elastic fluid makes another circuit of the buckets the same as when starting from the admission-nozzle, which is here repeated but once, but which could be repeated indefinitely.

Exit-passages 18 are in each block and arranged to connect with the second row of buckets 16, the steam passing therethrough to the exhaust-channel 19, which extends entirely around the casing 1 and connects, by suitable passages 20, to a passage 22 through the base 9, whence it may connect to a suitable condenser, if desired.

In Fig. 2 the structure of Fig. 1 is modified, showing how the nozzles may lead from the casing side, when of course the chamber 11 and supply-nozzles would be in the casing, as distinguished from the casing-cover.

In Fig. 13 the arrangement of the nozzle and guide passage block 4 is somewhat different from that in the other figures, and its opposite sides are made flat and parallel and the buckets are shaped to correspond thereto.

Having thus described and indicated the relation of the various parts of my improved turbine, I will now indicate the operation of the same. The elastic fluid which I will refer to will be steam, although of course compressed air or other elastic fluid might be used.

The steam enters the passage 10 and is conveyed by the passage 11' to the chamber 11, where it is distributed to the several small passages 12, which lead to the admission-nozzles 13 for each block 4, which lead, preferably at an angle of twenty degrees, to the plane of the wheel into the first row of buckets 14 14, being the outer edge of such buckets toward the periphery of the wheel. The steam delivered through these nozzles delivers an impact force on entering and a reactionary force on leaving the buckets 14 at an angle to the direction of the delivery-nozzles, whence it passes into the first curved guide-passage 15, where the direction is reversed, the same passing therefrom into the second row of buckets 16, set at the opposite side of the guide-passage and arranged exactly symmetrical and opposite to the first row of buckets 14. The steam then passes through the buckets 16, imparts an impact force on entering the inner sides of such buckets and a reactionary force on leaving the outer sides toward the periphery. From the outer sides of the buckets 16 the steam flows into another passage 17 through the block 4. This passage receiving the fluid from the outer side of the buckets 16, changes its direction, as clearly appears in the sectional view in Fig. 11, and passes just in advance of the inlet-nozzles and delivers the steam against the first row of buckets 14. The steam then passes through another of the guide-passages 15, and from this guide-passage into the rows of buckets 16, as before, just in advance of its first entry, and from these buckets 16 it flows to the outer side and into the exit-passages 18, thence to the exhaust-chamber 19, where the steam eventually passes through the passage 20 into the base 9.

In the modification appearing in Fig. 2 the fluid passes in, as above indicated, into the passage 10 and thence directly into the fluid-chamber 11', thence through a short passage 12 into a passage 13 to the opposite side of the nozzle and guide passage block 4, where it connects to the channel leading to the admission-nozzle, the passage 13' and admission-nozzle 13 being partially formed by a plate 4'. From this it will be seen that the steam is compounded and expands in its progress around the wheel, being used as many times as may be desired.

I desire to remark that these buckets are preferably electroplated with copper or nickel or other metal which is not liable to tarnish and which may be burnished and present a very smooth surface to the action of the steam.

From this description the relation of the parts of my improved turbine is clear. I desire to remark that the same can be considerably varied in its structural details without departing from my invention.

Having thus described my invention, what I claim as new, and desire to secure by Letters Patent, is—

1. In an elastic-fluid turbine, the combination of the casing 1, supported by a suitable flange 24 on a base 22, having an annular exhaust-chamber connected by passages 19, 2 and 22 with said base; a casing-cover 2, suitably joined to the said casing; an inlet-passage 10; a passage 11' connecting to an annular supply-passage 11 in the casing-cover; a shaft 5 with a suitable flange axially arranged in said casing and supported in suitable bearings supported by a bracket 7" to the said casing and casing-cover with means for longitudinally adjusting said shaft; a flange on the shaft; a turbine-wheel consisting of two halves bolted to the said flange and bolted to each other and having oppositely-faced rows of curved buckets formed to be actuated by the impact of a steam-jet and the reaction therefrom; nozzle and guide passage blocks 4 secured to the casing 1, and containing an inlet-passage 12 leading to a nozzle 13 delivering at the outer side of buckets 14; recurved passages 15 leading from the inner ends of the buckets 14 to the inner ends of the buckets 16; recurved passage 17 leading from the outer end of the buckets 16 to the outer ends of the buckets 14; a recurved guide-passage 15 leading to the inner sides of the buckets 16; an exit-passage 18' leading from the outer sides of the buckets 16 to the exhaust-passage 19, coacting substantially as described and for the purpose specified.

2. In a turbine-engine, the combination of oppositely-faced curved rows of buckets curving in the same direction to receive impulse from the impact of a jet of steam and from the reaction thereof; an intermediate nozzle and guiding passage block provided with a nozzle leading to the outer end of one row of said buckets; recurved guide-passages connecting the inner sides of the opposite rows of said buckets; and recurved guide-passage connecting the outer sides of the said opposite rows of buckets; suitable exhaust-passages leading therefrom, all coacting as specified.

3. In an elastic-fluid turbine-engine, the combination of a casing 1 with the cover 2; an annular inlet-passage 11 arranged within said casing and cover, connecting to the delivery-nozzles 13 through the passages 12; an annular exhaust-chamber 19 on the opposite side of said casing; a shaft 5 arranged through the said casing with longitudinally-adjustable bearings, with a water seal at the sides of the casing for embracing the said shaft; a flange 6 on the said shaft; a turbine-wheel consisting of disks 3 3' secured to the opposite sides of said flange, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; fluid-chambers embracing the sides of said wheel, to insure even distribution of temperature and consequent even expansion, nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheels; and an exhaust-passage 18 leading from the outer side of the bucket 16 to the exhaust-chamber in the casing, the same being arranged in advance of the inlet-passage 13 sufficiently to permit one or more circulations through the buckets of the fluid before it exhausts from the engine, all coacting for the purpose specified.

4. In an elastic-fluid turbine-engine, the combination of a casing 1 with the cover 2; an annular inlet-passage 11 arranged within said casing and cover, connecting to the delivery-nozzles; an annular exhaust-chamber 19 on the opposite side of said casing; a shaft 5 arranged through the said casing with longitudinally-adjustable bearings, with a water seal at the sides of the casing for embracing the said shaft, and having oppositely-faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; fluid-chambers embracing the sides of said wheel; to insure even distribution of temperature and consequent even expansion; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16, a guide-passage 17 delivering from the outer side of the buckets 16 to the outer side of the buckets 14, whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13 sufficiently to permit one or more circulations through the buckets of the fluid before it exhausts from the engine, all coacting for the purpose specified.

5. In an elastic-fluid turbine-engine, the combination of a casing 1 with the cover 2; an annular inlet-passage 11 arranged within said casing and cover, connecting to the delivery-nozzles 13 through the passages 12; an annular exhaust-chamber 19 on the opposite side of said casing; a shaft 5 arranged through said casing with longitudinally-adjustable bearings, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; fluid-chambers embracing the sides of said wheel, to insure even distribution of temperature and consequent even expansion; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13 sufficiently to permit one or more circulations through the buckets of the fluid before it exhausts from the engine, all coacting for the purpose specified.

6. In an elastic-fluid turbine-engine, the combination of a casing 1 with the cover 2; an annular inlet-passage 11 arranged within said casing and cover, connecting to the delivery-nozzles; an annular exhaust-chamber 19 on the opposite side of said casing; a shaft 5 arranged through the said casing with longitudinally-adjustable bearings, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; fluid-chambers embracing the sides of said wheel, to insure even distribution of temperature and consequent even expansion; nozzle and guide passage blocks 4 secured to the said casing and arranged between the oppositely-faced buckets 14 and 16 and containing a nozzle-passage 13 delivering to the buckets 14; a recurved guide passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust passage 18 leading from the outer side of the bucket 16 to the exhaust-chamber in the casing, the same being arranged in advance of the inlet-passage 13 sufficiently to permit one or more circulations through the buckets of the fluid before it exhausts from the engine, all coacting for the purpose specified.

7. In an elastic-fluid turbine-engine, the combination of a casing 1 with the cover 2; an annular inlet-passage 11 arranged within said casing and cover, connecting to the delivery-nozzles 13 through the passages 12; an annular exhaust-chamber 19 on the opposite side of said casing; a shaft 5 arranged through the said casing with longitudinally-adjustable bearings, with a water seal at the sides of the casing for embracing the said shaft, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; nozzle and guide passage blocks 4 secured to the said casing and arranged between the oppositely-faced buckets 14 and 16 and containing a nozzle-passage 13 delivering to the buckets 14; a recurved guide-passage 15 conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13 sufficiently to permit one or more circulations through the buckets of the fluid before it exhausts from the engine, all coacting for the purpose specified.

8. In an elastic-fluid turbine-engine, the combination of a casing 1 with the cover 2; an annular inlet-passage 11 arranged within said casing and cover, connecting to the delivery-nozzles; an annular exhaust-chamber 19 on the opposite side of said casing; a shaft 5 arranged through said casing with longitudinally-adjustable bearings, with a water seal at the sides of the casing for embracing the said shaft, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-chamber in the casing, the same being arranged in advance of the inlet-passage 13 sufficiently to permit one or more circulations through the buckets of the fluid before it exhausts from the engine, all coacting for the purpose specified.

9. In an elastic-fluid turbine-engine, the combination of a casing 1 with the cover 2; an annular inlet-passage 11 arranged within said casing and cover, connecting to the delivery-nozzles; an annular exhaust-chamber 19 on the opposite side of said casing; a shaft 5 arranged through the said casing with longitudinally-adjustable bearings, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13 sufficiently to permit one or more circulations through the buckets of the fluid before it exhausts from the engine, all coacting for the purpose specified.

10. In an elastic-fluid turbine-engine, the combination of a casing 1 with the cover 2; an annular inlet-passage 11 arranged within said casing and cover, connecting to the delivery-nozzles 13 through the passages 12; an annular exhaust-chamber 19 on the opposite side of said casing; a shaft 5 arranged through the said casing with longitudinally-adjustable bearings, with a water seal at the sides of the casing for embracing the said shaft, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; fluid-chambers embracing the sides of said wheel, to insure even distribution of temperature and consequent even expansion; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16, to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13, all coacting for the purpose specified.

11. In an elastic-fluid turbine-engine, the combination of a casing 1 with the cover 2; an annular inlet-passage 11 arranged within said casing and cover, connecting to the delivery-nozzles; an annular exhaust-chamber 19 on the opposite side of said casing; a shaft 5 arranged through the said casing with longitudinally-adjustable bearings, with a water seal at the sides of the casing for embracing the said shaft, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; fluid-chambers embracing the sides of said wheel, to insure even distribution of temperature and consequent even expansion; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13, all coacting for the purpose specified.

12. In an elastic-fluid turbine-engine, the combination of a casing 1 with the cover 2; an annular inlet-passage 11 arranged within said casing and cover, connecting to the delivery-nozzles 13 through the passages 12; an annular exhaust-chamber 19 on the opposite side of said casing; a shaft 5 arranged through the said casing with longitudinally-adjustable bearings, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; fluid-chambers embracing the sides of said wheel, to insure even distribution of temperature and consequent expansion; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13, all coacting for the purpose specified.

13. In an elastic-fluid turbine-engine, the combination of a casing 1 with the cover 2; an anular inlet-passage 11 arranged within said casing and cover, connecting to the delivery-nozzles; an annular exhaust-chamber 19 on the opposite side of said casing; a shaft 5 arranged through the said casing with longitudinally-adjustable bearings, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; fluid-chambers embracing the sides of said wheel, to insure even distribution of temperature and consequent even expansion; nozzle and guide passage blocks 4, secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13, all coacting for the purpose specified.

14. In an elastic-fluid turbine-engine, the combination of a casing 1 with the cover 2; an annular inlet-passage 11 arranged within said casing and cover, connecting to the delivery-nozzles 13 through the passages 12; an annular exhaust-chamber 19 on the opposite side of said casing; a shaft 5 arranged through the said casing with longitudinally-adjustable bearings, with a water seal at the sides of the casing for embracing the said shaft, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13, all coacting for the purpose specified.

15. In an elastic-fluid turbine-engine, the combination of a casing 1 with the cover 2; an annular inlet-passage 11 arranged within said casing and cover, connecting to the delivery-nozzles; an annular exhaust-chamber 19 on the opposite side of said casing; a shaft 5 arranged through the said casing with longitudinally-adjustable bearings, with a water seal at the sides of the casing for embracing the said shaft, and having oppositely faced and curved buckets 14 and 16 on the two sides thereof, with annular grooves in their faces, each bucket being of the recurved type, whereby it receives an impact from a jet of fluid at one side; and is reacted upon by the exit of the fluid at the opposite side; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13, all coacting for the purpose specified.

16. In an elastic-fluid turbine-engine, the combination of a casing 1 with the cover 2; an annular inlet-passage 11 arranged within said casing and cover, connecting to the delivery-nozzles; an annular exhaust-chamber 19 on the opposite side of said casing; a shaft 5 arranged through the said casing with longitudinally-adjustable bearings, and having oppositely faced and curved buckets 14 and 16 on the two sides thereof, with annular grooves in their faces, each bucket being of the recurved type, whereby it receives an impact from a jet of fluid at one side and is reacted upon by the exit of the fluid at the opposite side; nozzle and guide passage blocks 4 secured to the said casing and arranged between the oppositely-faced buckets 14 and 16 and containing a nozzle-passage 13 delivering to the buckets 14; a recurved guide-passage 15 for conveying steam from the inner side of the buckets 14 to the inner side of the buckets 16; a guide-passage 17 delivering from the outer side of the buckets 16 to the outer side of the buckets 14 whereby the elastic fluid circulates and delivers a series of impacts to the buckets of the turbine-wheel; and an exhaust-passage 18 leading from the outer side of the bucket 16 to the exhaust-chamber in the casing, the same being arranged in advance of the inlet-passage 13, all coacting for the purpose specified.

17. In an elastic-fluid turbine, the combination of suitable casings; a shaft within the casings having suitable flanges; a turbine-wheel having disks 3 3' secured to the sides of said flange, and having oppositely faced and curved buckets 14 and 16, on the two halves thereof, with circular grooves in the face, each bucket being of the recurved type, whereby it receives an impact from a jet of fluid at one side, and is reacted upon by the exit of fluid at the opposite side, suitable exhaust-passages leading therefrom, for the purpose specified.

18. In a turbine-engine, the combination with a suitable casing with a shaft arranged therethrough of oppositely-faced U-shaped buckets 14 and 16 of the recurved type, whereby the jet imparts an impulse and a further impulse is imparted by the reaction of the fluid; a guide-block arranged between the oppositely-faced buckets, having nozzle-passages leading thereto and recurved guide-passages for passing the steam from the buckets of one side to the opposite side, and vice versa; and an exhaust-passage in advance of the nozzle-passage to secure the circulation of the steam through the buckets until its expansive force is utilized, coacting as specified.

19. In a turbine-engine, the combination with a suitable casing with a shaft arranged therethrough of oppositely-faced buckets 14 and 16 of the recurved type, whereby the jet imparts an impulse and a further impulse is imparted by the reaction of the fluid; a guide-block arranged between the oppositely-faced buckets, having nozzle-passages leading thereto and recurved guide-passages for passing the steam from the buckets of one side to the opposite side, and vice versa; and an exhaust-passage in advance of the nozzle-passage to secure the circulation of the steam through the buckets until its expansive force is utilized, coacting as specified.

20. In a turbine-engine, the combination with a suitable casing with a shaft arranged therethrough of oppositely-faced U-shaped buckets 14 and 16 of the recurved type, whereby the jet imparts an impulse and a further impulse is imparted by the reaction of the fluid; a guide-block arranged between the oppositely-faced buckets, having nozzle-passages leading thereto and recurved guide-passages for passing the steam from the buckets of one side to the opposite side, and vice versa; and an exhaust-passage in advance of the nozzle-passage to secure a circulation of the steam through the buckets, coacting as specified.

21. In a turbine-engine, the combination with a row of U-shaped recurved buckets of admission-nozzles delivering to the outer periphery thereof; and guide-passages from the inner sides thereof the discharge-outlets from the buckets being at an angle to the direction of the delivery-nozzles.

22. In an elastic-fluid turbine-engine, the combination of suitable casings; a shaft within the casings having suitable flanges, a turbine-wheel having disks 3 3' secured to the sides of said flange; and having oppositely faced and curved buckets 14 and 16 on the two halves thereof, with circular grooves in the face, each bucket being of the recurved type, whereby it receives an impact from a jet of fluid at one side, and is reacted upon by the exit of fluid at the opposite side, suitable exhaust-passages leading therefrom, a part projecting between the said buckets with recurved passages leading from the inner side of one bucket to the inner side of the opposite bucket and discharging from the outer side of said receiving-bucket, to the outer side of the opposite bucket, securing a circulation of steam which permits its expansion, as specified.

In witness whereof I have hereunto set my hand and seal in the presence of two witnesses.

CHARLES W. DAKE. [L. S.]

Witnesses:
 ADELAIDE I. ADAMS,
 OTIS A. EARL.